May 23, 1939.  A. W. LE FEVRE ET AL  2,159,333

ELECTRIC SPEEDOMETER

Filed Nov. 23, 1934  10 Sheets-Sheet 1

Inventors:
Arden W. LeFevre
Willard H. Farr
John B. Whitted
George E. Coxon
By Williams, Bradbury, McCaleb & Hinkle
Attys.

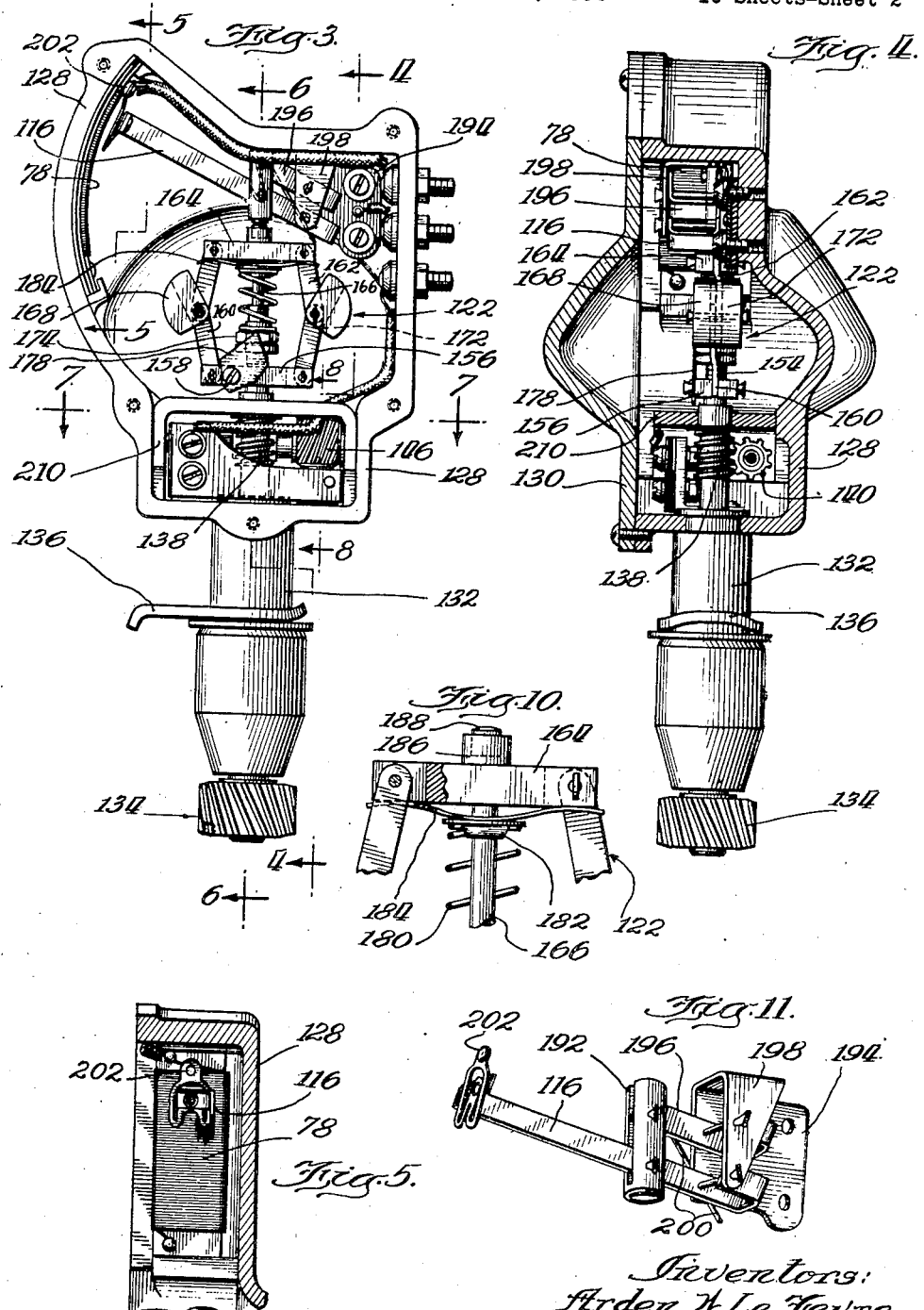

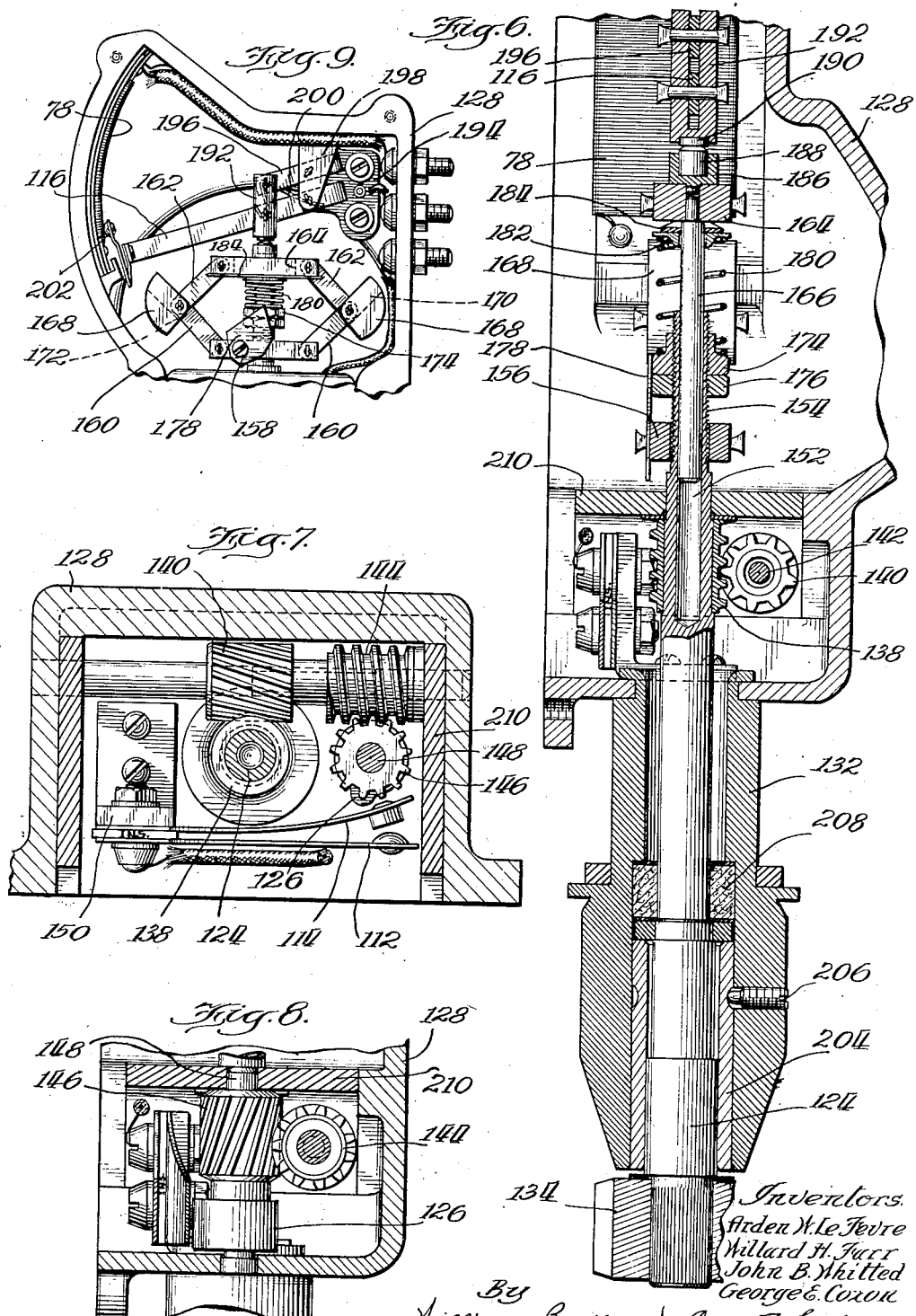

May 23, 1939.  A. W. LE FEVRE ET AL  2,159,333
ELECTRIC SPEEDOMETER
Filed Nov. 23, 1934  10 Sheets-Sheet 4

Inventors:
Arden W. LeFevre
Willard H. Farr
John B. Whitted
George E. Coxon
By Williams, Bradbury, McCaleb & Hinkle
Attys.

May 23, 1939.  A. W. LE FEVRE ET AL  2,159,333
ELECTRIC SPEEDOMETER
Filed Nov. 23, 1934  10 Sheets-Sheet 5

Inventors:
Arden W. Le Fevre
Hillard H. Farr
John B. Whitted
George E. Coxon
By Williams, Bradbury, McCaleb & Hinkle
Attys.

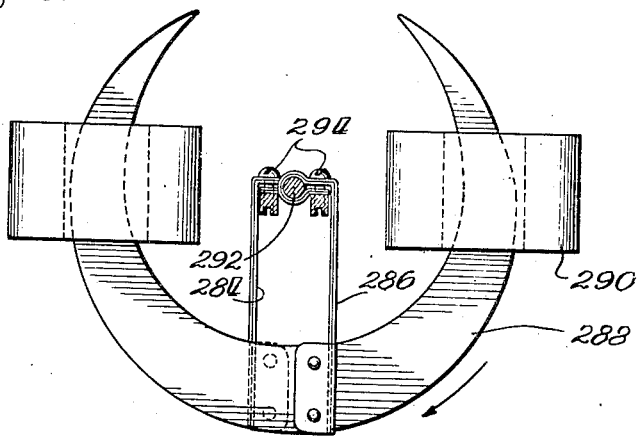
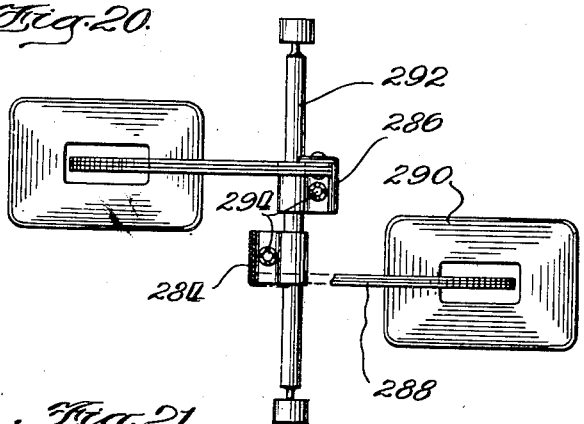
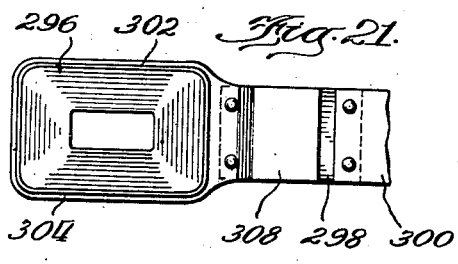
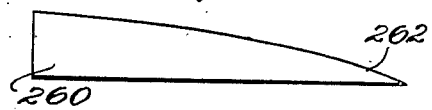
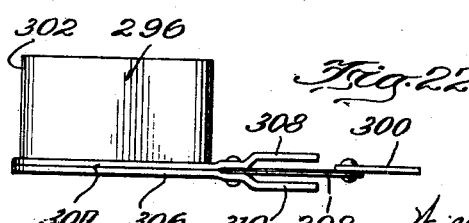

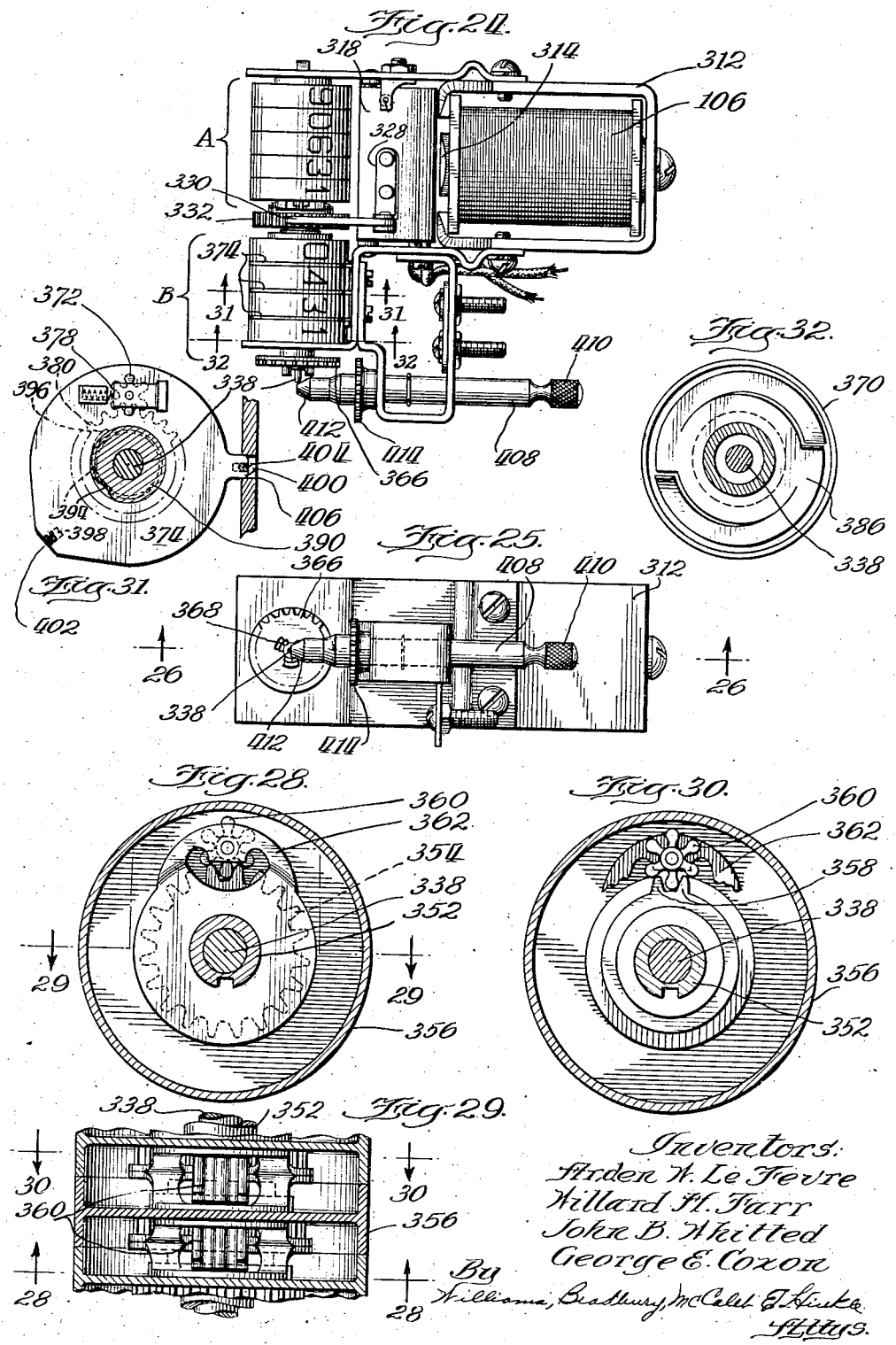

May 23, 1939.　　A. W. LE FEVRE ET AL　　2,159,333
ELECTRIC SPEEDOMETER
Filed Nov. 23, 1934　　10 Sheets-Sheet 8

Inventors:
Arden W. LeFevre
Hillard H. Farr
John B. Whitted
George E. Coron
By Williams, Bradbury, McCaleb & Hinkle
Attys.

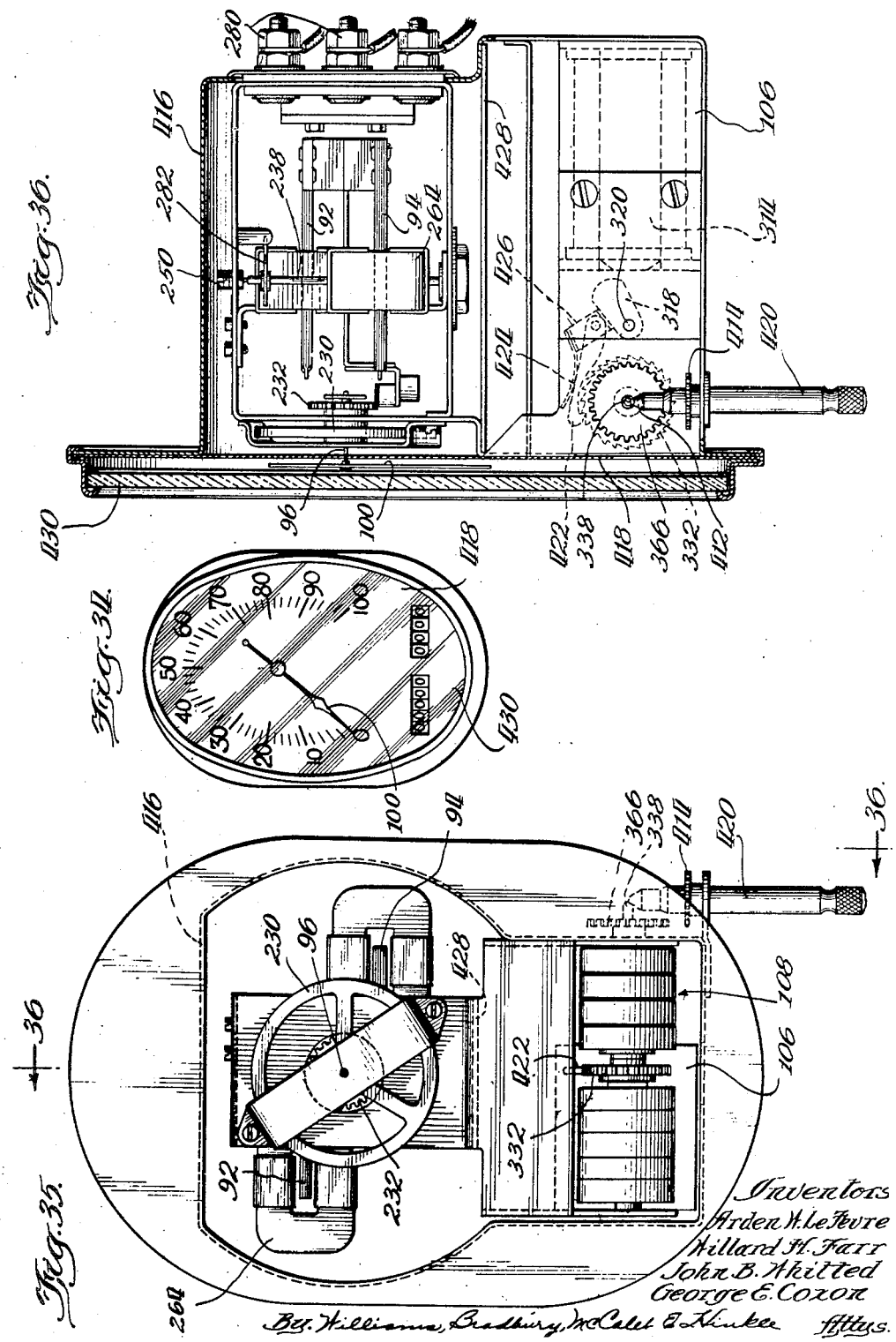

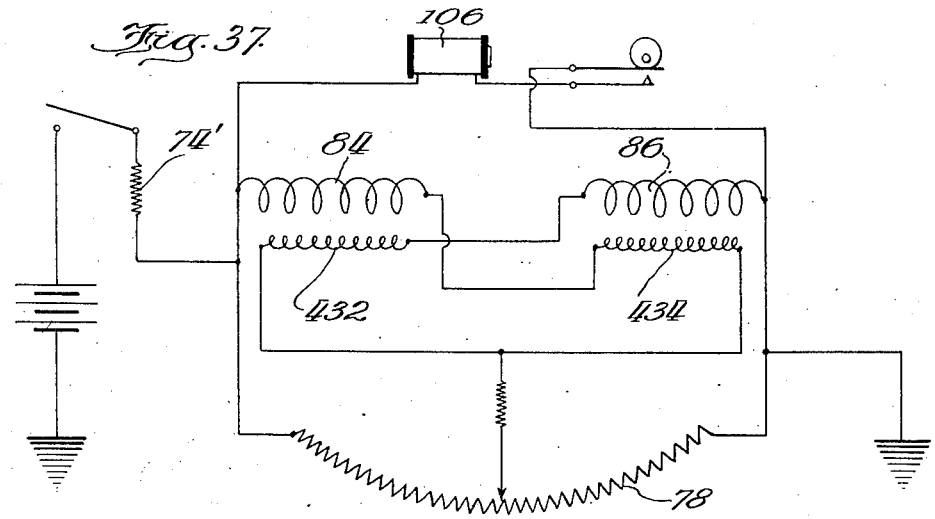
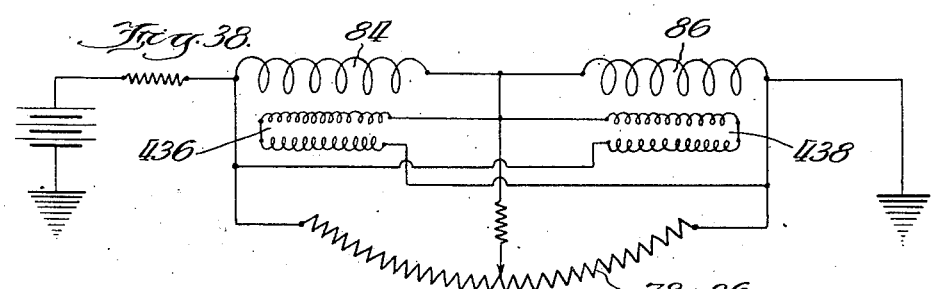
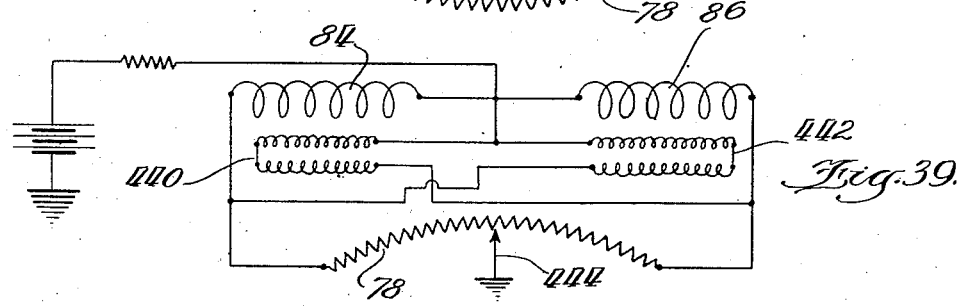
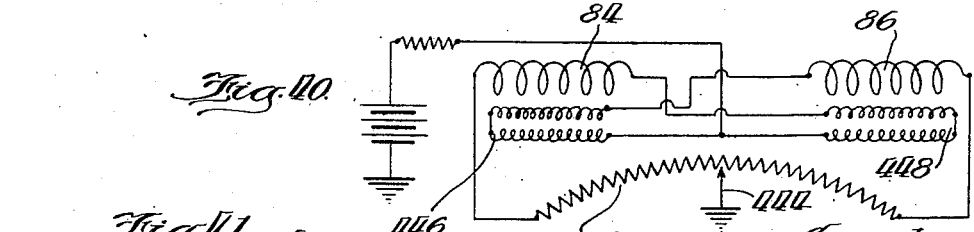
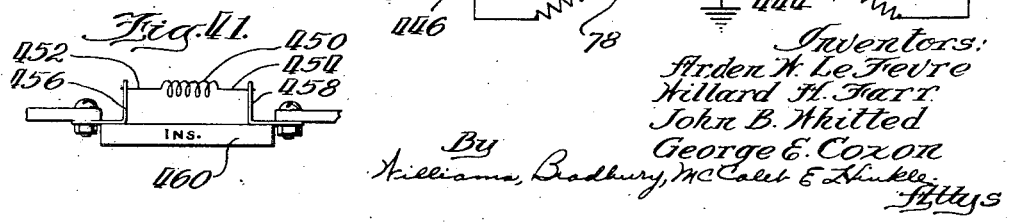

Patented May 23, 1939

2,159,333

UNITED STATES PATENT OFFICE 2,159,333

ELECTRIC SPEEDOMETER

Arden W. Le Fevre and Willard H. Farr, Chicago, Ill., George E. Coxon, Cicero, and John B. Whitted, Evanston, Ill., assignors to Stewart-Warner Corporation, Chicago, Ill., a corporation of Virginia Application November 23, 1934, Serial No. 754,522

53 Claims. (Cl. 175—183)

This invention relates to electric speedometers and is particularly concerned with the provision of an electric speedometer adapted for use as a part of the standard factory equipment of an automotive vehicle.

Automotive vehicles are now equipped with speedometers in which the speed and mileage indicators are driven through a flexible shaft connected to the rear of the transmission or through some other part which rotates with the drive wheels of the vehicle. Such speedometers are not adapted for use on vehicles in which the indicating means must be located at a relatively great distance from the mechanism which drives the drive wheels of the vehicle, since prolongation of the flexible drive shaft for the speedometer materially increases its cost, results in high friction losses therein, and absorbs an unduly large percentage of the power of the vehicle engine. These friction losses, and the rapid wear which results therefrom, are further increased where the flexible shaft for driving the speedometer must be bent into curves of short radius in order to avoid obstructing parts of the vehicle chassis or body.

These limitations make the present type of mechanically-driven speedometer particularly ill-adapted for use on vehicles in which the engine is mounted at the rear of the vehicle.

The present mechanically-driven speedometers have a further and serious disadvantage. Because the speed and mileage indicators are mechanically driven from the same flexible shaft, it is imperative, from a practical standpoint, that the speed and mileage indicators be embodied in the same casing, and such is the universal custom. This undesirably restricts the arrangement of instruments on the instrument board or panel of an automotive vehicle.

An object of our invention is to provide a speedometer which is particularly adapted to form part of the standard factory equipment of a rear engined automotive vehicle.

Another object is to provide a speedometer having speed and mileage indicators which are equally adapted for mounting in the same case or in cases which may be located at opposite ends of the instrument board of an automotive vehicle.

Another object is to provide an electric speedometer which can be driven from the automobile battery.

Another object is to provide an electric speedometer which will automatically compensate for variations in the effective voltage of the automobile battery.

Another object is to provide an electric speedometer which consumes such a small current that it does not constitute an important drain on the automobile battery.

Another object is to provide an electric speedometer which consumes no current when the automotive vehicle, of which it forms a part, is not operating.

Another object is to provide an electric speedometer which accurately and promptly follows the acceleration and deceleration of the automotive vehicle of which it is a part.

Another object is to provide an electric speedometer which is not affected by vibration of the automotive vehicle of which such speedometer forms a part.

Another object is to provide an electric speedometer which requires no attention on the part of the operator of the automotive vehicle.

Another object is to provide an electric speedometer which automatically compensates for the heating effects of the current in the speedometer circuit.

Another object is to provide a noiseless speedometer.

Another object is to provide an electric speedometer having a speed-indicating scale extending over an arc of more than one-hundred and eighty degrees.

Another object is to provide an electric speedometer having a compact indicator mechanism which need not be counterbalanced critically.

Another object is to provide a structure wherein friction is reduced to a minimum and wherein the friction losses are so negligible that they do not affect the accuracy of the instrument.

Another object is to provide means whereby the trip mileage indicator may be reset easily and quickly and without disturbing the electrical connections or electrical constants of the speedometer circuits.

Another object is to provide an electric speedometer which may be calibrated easily.

Another object is to provide improved mechanism for carrying out the foregoing objects.

Another object is to provide an electric speedometer which is economical to manufacture and durable and reliable under hard usage.

Other objects and advantages will appear as the description proceeds.

In the drawings:

Figure 3 is an elevation, partly in section, of the mechanism for translating rotating movement into current variations;

Figure 4 is a view taken on the line 4—4 of Figure 3;

Figure 5 is a sectional view taken on the line 5—5 of Figure 3;

Figure 6 is an enlarged sectional view taken on the line 6—6 of Figure 3;

Figure 7 is a horizontal section taken on the line 7—7 of Figure 3;

Figure 8 is a vertical section taken on the line 8—8 of Figure 3;

Figure 9 is a partial view similar to the upper part of Figure 3 but showing the mechanism in a different position;

Figures 10 and 11 are enlarged views of details of the mechanism shown in Figure 3;

Figures 19 and 20 are two views taken at right-angles to each other and showing a modified type of armature mounting;

Figures 21 and 22 are two views taken at right-angles to each other and showing a modified type of coil mounting;

Figure 23 is a developed view showing the armature taper;

Figure 24 is a plan view of the mileage indicator;

Figure 25 is an end view of the mechanism shown in Figure 24;

Figure 26 is a horizontal section taken on the line 26—26 of Figure 25;

Figure 27 is a vertical section taken on the line 27—27 of Figure 26;

Figure 28 is a sectional view showing a detail and is taken on the line 28—28 of Figure 26, and may also be considered as taken on the line 28—28 of Figure 29;

Figure 29 is a horizontal section taken on the line 29—29 of Figure 28;

Figure 30 is a sectional view similar to Figure 28 and is taken on the line 30—30 of Figure 29;

Figures 31 and 32 are sectional views showing other details and are taken, respectively, on lines 31—31 and 32—32 of Figure 24;

Figure 33 is a sectional view showing a detail and is taken on the line 33—33 of Figure 26;

Figure 34 is an elevational view of a modification showing the speed and mileage indicators mounted in the same casing;

Figure 35 is an elevational view similar to Figure 34 except that the dial pointer and glass have been removed;

Figure 36 is a vertical section taken on the line 36—36 of Figure 35;

Figures 37, 38, 39 and 40 are circuit diagrams showing different types of electrical circuits; and Figure 41 shows a preferred mounting for the ballast resistance.

Figure 1:
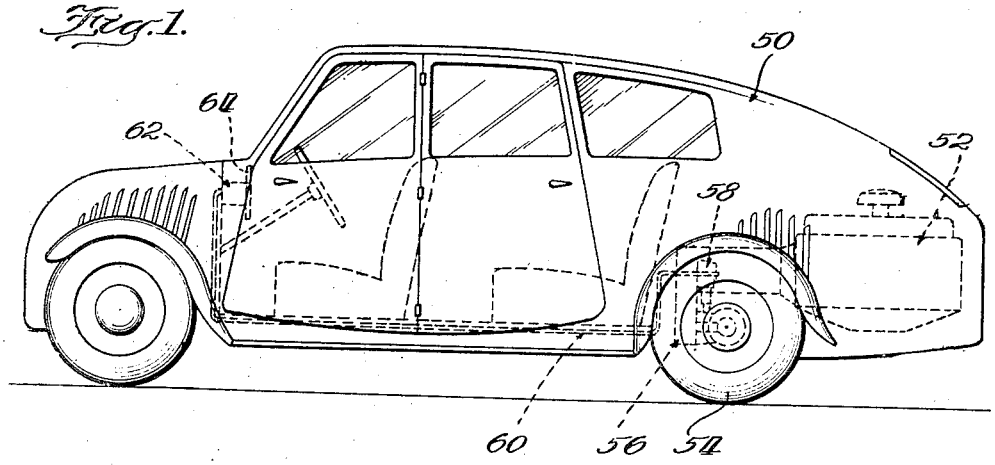
Figure 1 is a side elevation of a rear engined automobile, showing the manner in which our electric speedometer is applied thereto.

Referring to Figure 1 of the drawings, we have shown an automobile indicated generally by reference numeral 50 having a rear mounted engine 52 which drives the rear wheels 54 through power transmitting mechanism, indicated generally by reference numeral 56. The translating mechanism of our novel speedometer is mounted as indicated at 58, so that it is driven by a part of the power transmitting mechanism 56 which always rotates in uniform speed relationship with the rear wheels 54, irrespective of whether such wheels are being driven by the engine 52. The translating mechanism 58 accurately translates the rotation of this shaft into variable electrical energy which is conducted by wires 60 to the indicating means 62 which is located on the instrument board 64 of the vehicle.

Figure 2:
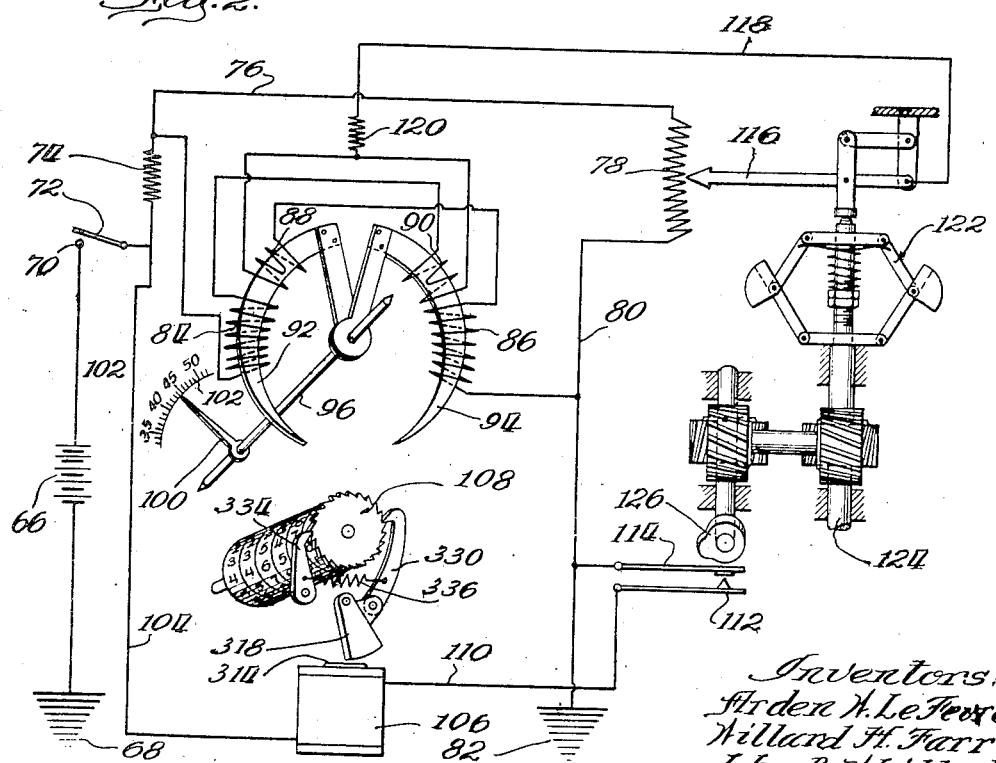
Figure 2 is a diagrammatic layout, indicating the various elements of our novel speedometer and their electrical relationships.
Figure 12:
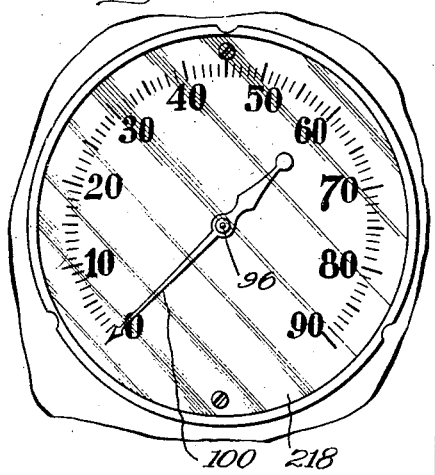
Figure 12 is a view showing the face of one type of speed indicator.
Figure 17:
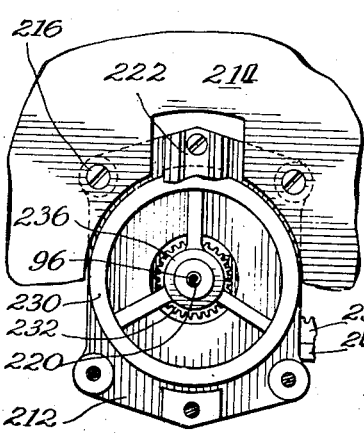
Figure 17 is a sectional view of a detail and is taken on the line 17—17 of Figure 14.
Figure 18:
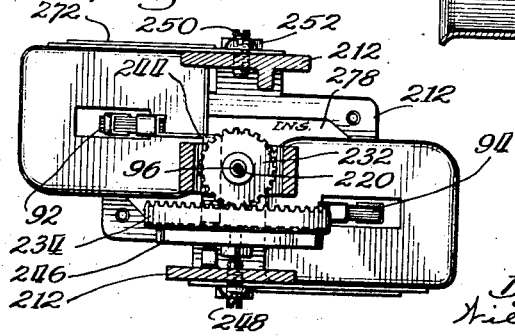
Figure 18 is a sectional view taken on the line 18—18 of Figure 14.
Figure 13:
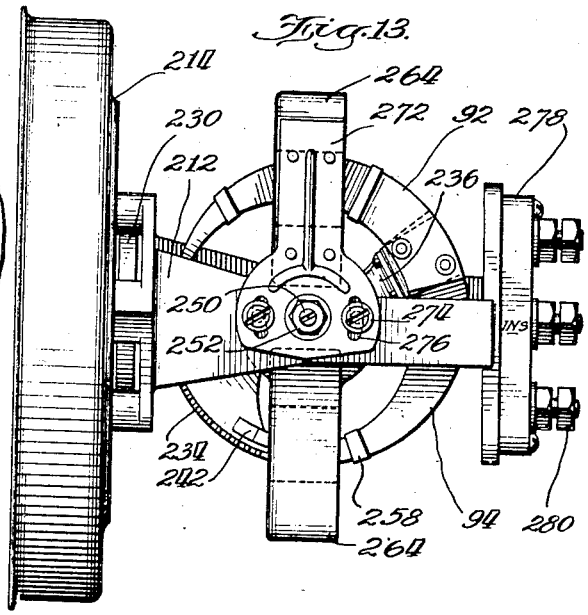
Figure 13 is a top plan view of one type of speed indicator operating mechanism.
Figure 14:
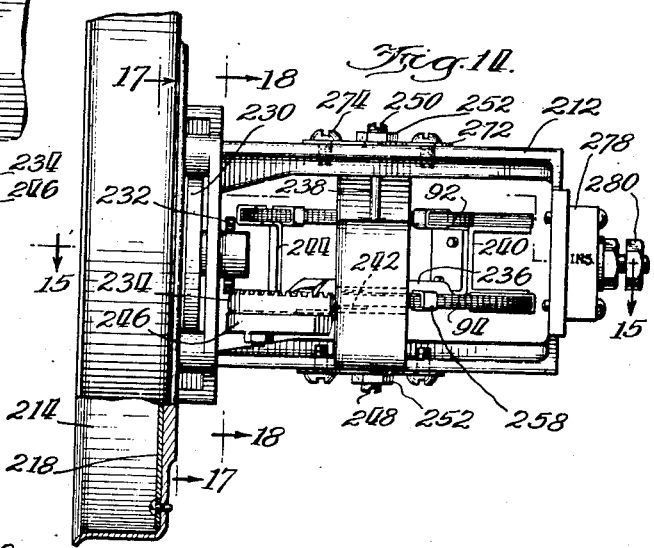
Figure 14 is a side view of the mechanism shown in Figure 13.

In Figure 2 the electrical circuit and the several parts of the mechanism are diagrammatically shown with their respective electrical relationships. In this figure we have indicated the conventional battery of the automobile 66 as having one terminal grounded at 68 to the automobile frame. The other terminal of battery 66 is connected to one contact 70 of the ignition switch which controls the ignition system of the automobile engine. The other contact 72 of the ignition switch is connected to the ignition system of the automobile engine in the usual manner and also forms a part of the electrical circuit of our novel electric speedometer.

The contact 72 is connected through the medium of a ballast resistance 74 with a wire 76 leading to a resistance 78 grounded by wire 80 to the frame of the automobile, as indicated at 82. In parallel with the resistance 78 is a circuit consisting of magnet coils 84 and 86 and heating coils 88 and 90, all connected in series and associated with the armatures 92 and 94 attached to a shaft 96 which controls the speed indicating pointer 100 and moves it in relation to a scale 102.

Also connected to contact 72 is a wire 104 leading to the coil of an electromagnet 106 which actuates the mileage indicator 108. Wire 110 connects the coil of magnet 106 with one side of a separable contact 112 of a switch having a second contact 114 connected to the wire 80.

A slider 116 is in electrical contact with the resistance 78 and is connected by means of wire 118 and ballast resistance 120 with the circuit including coils 84, 86, 88 and 90 at a point intermediate the heating coils 88 and 90. The position of the slider 116 is controlled by a speed responsive device 122 mounted on a shaft 124 which is driven by a part of the vehicle which always rotates in unison with the driving wheels thereof. The contacts 112 and 114 are controlled by a cam 126 driven from shaft 124 through intermediate gearing.

Neglecting for the moment the heating coils 88 and 90, it will be seen that the magnetic coils 84 and 86 are connected in series and tend to rotate the indicator shaft 96 in opposite directions. The circuit containing the magnetic coils 84 and 86 is in parallel with the circuit containing the resistance 78. The circuit containing the slider 116 connects a point on the resistance 78 with a point in the coil circuit which is intermediate the magnetic coils 84 and 86 so that, by shifting the slider 116, the relative values of the currents passing through magnetic coils 84 and 86 can be changed, with resultant changes in the forces exerted by these magnets on the armatures 92 and 94.

The magnetic coil 84 or 86, which has its current increased, acts to pull into itself a part of its armature which has a larger cross-section, and this results in movement of the shaft 96 and pointer 100. When a balance has been reached between the cross-sectional sizes of the armatures in the two coils and the values of the currents passing through these coils, then rotation of the shaft 96 ceases and the pointer 100 comes to rest.

The coil which receives the larger amount of current heats up to a greater extent than does the coil which receives a lesser value of current. The resistance of a wire increases with its temperature and, unless some means were provided to compensate for the temperature differential established between the magnetic coils 84 and 86, error would occur in the reading of the instrument. Heating coils 88 and 90 have been provided for the purpose of overcoming this difficulty.

The circuit through the coils 84, 86, 89 and 90 is so laid out that any current passing through the magnetic coil 84 must also pass through the heating coil 90 which is wound on the outside of the magnetic coil 86, and likewise any current which passes through the magnetic coil 86 must pass through the heating coil 88 which is wound on the outside of the magnetic coil 84.

The heating coils 88 and 90 produce no magnetic effect on the armatures 92 and 94 since one-half of the loops in each of the heating coils 88 and 90 are wound in one direction, and the other half of the loops of each of these heating coils are wound in the opposite direction.

If the slider 116 be set so that the magnetic coil 84 is receiving a larger current than the magnetic coil 68, and magnetic coil 84 tends to heat up because of such larger current, then heating coil 90, which receives the same current which passes through magnetic coil 84, likewise heats up and raises the temperature of magnetic coil 86 at the same rate that the temperature of magnetic coil 84 is raised.

The battery 66 has an effective voltage which varies widely under different conditions. The conditions which affect this voltage are the battery charge; the rate at which this battery is being charged by the generator associated with the automobile engine; and the rate at which current is being withdrawn from the battery by the automobile running lights and other electrically-operated devices utilizing battery current. The fact that the armature shaft 96 is responsive only to differences in strength of opposing coils in and of itself, greatly reduces the effect of variations in the effective voltage of the automobile battery. However, we have found that additional means must be provided if the effect of varying battery voltage is to be completely offset. We have therefore provided the ballast resistances 74 and 120, previously referred to. Each of these ballast resistances comprises a resistance element formed of a special material having a high heat coefficient of resistance. When the battery voltage is low, the initial current flowing through the coils and resistance 78 is low, whereupon the ballast resistance 74 remains cool and its resistance remains low, thus permitting this value of current to continue. On the other hand, if the battery voltage is high and the initial current flowing through the coils and resistance 78 is high, the ballast resistance 74 quickly heats up, thereby increasing its resistance and reducing the current value to normal.

We have found that the effect of variations in battery voltage is most noticeable when the speedometer pointer is at one or the other end of the scale, and we have provided the ballast resistance 120 in the circuit of the slider 116 to correct this error. When the slider 116 is in mid position, as shown in Figure 2, substantially no current passes through the slider circuit, but when the slider is at either of its extreme positions, a maximum current passes through this slider circuit and through the ballast resistance 120.

In one speed indicator which we have made for indicating speeds up to 120 miles per hour, and designed for use with the usual 6 volt automobile battery, we incorporated a ballast resistance 74 having a resistance of .2 ohm, magnetic coils 84 and 86, each having a resistance of 7.5 ohms, a resistance 78 having a value of 15 ohms, a ballast resistance 120 having a value of .7 ohm, and a coil 106 having a resistance of 6 ohms. The foregoing resistances are the resistances of the several elements measured at an atmospheric temperature of approximately 70° F.

It is to be understood that the foregoing example is given as only one of many possible arrangements of different resistance values for the several elements, and is not to be construed as a limitation of our invention to the particular values given in this one instance.

We shall now describe our invention in greater detail. Referring first to Figures 3 through 11, inclusive, the translating means 58, previously referred to, includes a casing 128 having an open side which is normally closed by a removable cover 130. The casing 128 has a rigid tubular extension 132 which provides bearing means for the shaft 124, likewise previously described. The lower end of the shaft 124 carries a gear 134 which is adapted to be engaged and driven by a complementary gear on a part which always rotates in uniform speed relationship with the driving wheels 54 of the automotive vehicle. The casing 128, and its tubular extension 132, are rigidly fastened to a part of the automobile frame by means of the clamp 136 or in any other suitable manner so that the gear 134 extends into engagement with the aforesaid complementary gear.

The shaft 124 carries a worm 138 which drives a worm-wheel 140 on a horizontal shaft 142 located in the lower compartment of the casing 128. Shaft 142 carries a worm 144 which drives worm-wheel 146 on vertical shaft 148 carrying the cam 126 for establishing a circuit through contacts 112 and 114.

Each of the contacts 112 and 114 comprises a resilient arm having a contact button attached to one end thereof. The arms are insulated from each other and are supported on a bracket 150 attached to the casing 128. The arm of contact 114 is bent away from contact 112 so that the contact buttons are normally out of contact with each other. When the projection on cam 126 engages the back of contact 114, the latter is pushed toward contact 112 until the buttons on the two contacts engage and close the electrical circuit therethrough, thus sending an impulse to the coil 106 and rotating the mileage indicator 108 one notch. After the buttons of contacts 112 and 114 engage, the projection on the cam 126 moves both contacts 114 and 112 away from the cam shaft 148, thereby producing a sliding movement between the buttons of contacts 112 and 114. This sliding movement maintains these contact buttons free from scale and dirt.

The upper end of shaft 124 is hollowed out as indicated at 152, and is externally threaded as indicated at 154. A cross-bar 156 is attached to the shaft 124 by means of clamping screw 158 and rotates with the shaft 124. Links 160 are pivoted in slots formed in the opposite ends of the cross-bar 156 and have their upper ends pivoted to upper links 162 whose other ends are pivoted in slots formed in the opposite ends of a second cross-bar 164 which is located above the upper end of shaft 124. The upper cross-bar 164 carries a guide pin 166 which slides in the bore 152 formed in the upper end of shaft 124.

A weight 168 is pivotally mounted on each pivot which connects a lower link 160 with an upper link 162. Each weight 168 has a slot indicated at 170 which receives the upper end of a link 160 and the lower end of a link 162.

An important feature of our invention lies in the design of these weights which are given a shape best described as an unsymmetrical heart shape. This brings the center of mass of each weight above and radially outward of the pivotal connection between each weight and its links 160 and 162 when the parts are in the position shown in Figure 3. Each weight 168 is held in the position shown in Figure 3 by the engagement of the lower end of its slot 170 with the outer edge of its supporting link 160, as indicated at 172.

The upper bar 164 is supported on a pair of springs carried on a nut 174 engaging the threads 154 on the upper end of shaft 124. A lock-nut 176 may be provided to prevent rotation of nut 174 on shaft 124 and, as a further precaution, both of these nuts may be held against rotation relative to shaft 124 by plate 178 which is secured to the lower bar 156 by screw 158. The lower of the two springs for supporting the upper bar 164 is a coil spring 180 mounted directly on the nut 174. The upper end of the coil spring 180 bears against a seat 182 slidably carried by pin 166. The seat 182 carries a leaf spring 184 which bears directly against the ends of upper bar 164. The outer ends of the leaf spring 184 are slotted to receive links 162 which prevent relative angular displacement between the upper bar 164 and the spring 184.

The spring 184 is generally weaker than the spring 180 so that, as the upper bar 164 is pulled down under the centrifugal force exerted by the weights 168, the spring 184 is almost completely compressed before any compression of the spring 180 occurs. It is important, however, that the spring 184 be not completely compressed before compression of the spring 180 begins, if a straight-line relationship between speed of rotation of the shaft 124 and axial movement of the bar 164 is to obtain.

Bar 164 carries a metal cup 186 containing a jewel 188 having a rounded upper end which engages the flat lower surface of a second jewel 190 mounted in the lower end of a link 192. The slider arm 116, referred to in the description of Figure 2, is pivoted to the lower end of the link 192 and is also pivoted to a supporting bracket 194. A second link 196 is pivotally connected to the upper end of link 192 and is also pivoted to the bracket 194 which is insulated from the casing 128.

As best shown in Figure 11, the part of the bracket to which the slider arm 116 and link 196 are pivoted, is U-shaped, as indicated at 198, and the associated ends of slider arm 116 and link 198 are similarly U-shaped but in planes which are perpendicular to the plane of the U-shaped section 198 of the bracket. This arrangement of links, slider arm and bracket, provides a parallelogram mounting for the slider arm 116 which gives the jewel 190 a direct sliding movement in a series of planes perpendicular to the axis of the shaft 124. The lower end of the link 192 is lightly held against the jewel 188 by spring 200. The outer end of the slider arm 116 carries a contact 202 which is in electrical engagement with the resistance 78.

When the shaft 124 is rotated in unison with the driving wheels 54 of the vehicle, cam 126 is driven in predetermined relationship with said driving wheels, and each rotation of this cam 126 closes the circuit through the magnet 106 and advances the mileage indicator one ratchet tooth. Rotation of the shaft 124 also rotates the weights 168 with their associated links and bars. The action of centrifugal force on these weights tends to move them outwardly and this force is transmitted to the links 160 and 162 in such manner as to create a downward pull on the upper bar 164 which is resisted by the springs 180 and 184. If the speedometer is to indicate accurately the speed of the vehicle, it is imperative that the movement of slider arm 116, with its contact 202, bear an accurate and constant relationship to the speed of the shaft 124, and the particular means for accomplishing this purpose constitute important features of our invention.

First of all, the weights 168 have their centers of mass above and radially outward of the pivotal connections between the links 160 and 162 when the weights are in a position of rest. This means that when rotation of the shaft 124 begins, the centrifugal force exerted by the weights 168 will be greater than would be the centrifugal force exerted by weights whose center of mass was at the same radial distance as is the pivotal connection between the links 160 and 162. Furthermore, because the centers of mass of the weights 168 are located above the pivotal connections between the links 160 and 162, the centrifugal force exerted by these weights acts through an increased lever arm so that the effect of the particular shape of weights shown in Figure 3 is to produce a large downward force on the bar 164 even when the shaft 124 is operating at low speeds.

This downward force serves initially to compress the leaf spring 184 and, as the speed increases and the centrifugal force becomes greater, the spring 180 begins to compress slightly before the leaf spring 184 is completely flattened. As the upper bar 164 moves downwardly, the slider arm 116 follows it and the relationship between the currents flowing in magnetic coils 84 and 86 is changed to produce a movement of the speedometer needle 100 in conformity with the change of vehicle speed.

As the vehicle speed continues to increase, the weights 168 approach the positions shown in Figure 9. As the weights move outwardly with increase in speed, and the angles between the links 160 and 162 become sharper, the centers of mass of the weights 168 approach closer and closer to the horizontal plane passing through the pivotal connections between the two sets of links. When a very high speed is reached, these centers of mass lie in the horizontal plane which passes through the weight pivots and thereafter further increase in speed will cause the lower ends of the slots 170 in the weights to separate from the links 160, and the weights 168 will float on their pivots with their centers of mass in the same plane with their pivotal connections.

We have found that a coil spring, such as the spring 180, in combination with a leaf spring, such as the spring 184, gives much better results than would a single spring or two coil springs of different strength. We have found that, by using weights of the shape shown, and a coil spring and leaf type spring of different strengths properly correlated to the size of weights used, the curve formed by plotting speed against movement of the bar 164 becomes a straight line. Such a straight-line relationship is essential to accurate reading of the indicating means.

The particular manner of supporting the slider arm 116 and controlling it from the movable bar 164, has several important advantages. In the first place, the relative rotation between the bar 164 and the controlling link 192 for the slider arm 116 occurs over an almost infinitesimal surface directly surrounding the axis of the shaft 124, so that the relative movement is a minimum. Furthermore, this arrangement makes possible the use of a double jeweled bearing which eliminates wear and further reduces the frictional loss. The parallelogram mounting of the link 192 maintains the link 192 in vertical alignment with the shaft 124 at all times so that the jewel 190 slides across the jewel 188 in perfect perpendicular relationship to the rotational axis of the latter. This arrangement eliminates the friction losses and undue wear which would occur if the jewel 188 acted directly on the pivoted slider arm 116. The slider arm 116 travels through such a short arc that it does not distort the straight-line speed-movement relationship between the shaft 124 and the upper bar 164.

Because of the vibration resulting from the travel of the automotive vehicle over a roadway, it is essential that the various parts of the speedometer mechanism be firmly mounted and protected against the destructive effects of this vibration. Shaft 124 is therefore carefully supported at widely separated points, one of which is at the lower end of the shaft, as viewed in Figure 6, this lower end being enlarged and engaging a bearing 204 which is held in place by screw 206. The bearing sleeve 204 also holds in place a lubricant-tight packing 208. The upper end of the shaft 124 is journalled in a bracket 210 which is welded or otherwise secured in place in the frame 128 and becomes in effect a part of this frame.

As best shown in Figure 3, this bracket 210 is U-shaped and provides a support for the horizontal shaft 142 and also provides an upper bearing for the cam shaft 148.

It is extremely desirable that the translating means of our electric speedometer be so designed that it can be mounted in any position on the frame or running gear of the automobile. We have accordingly provided a unique design of weights, springs and slider arm mounting and control, and shaft arrangements for operating these parts, as well as the circuit closing cam 146, which makes this translating unit capable of use in any position without regard to whether the axis of the shaft 124 be horizontal, vertical or inclined, or, if horizontal, whether this shaft projects forwardly, rearwardly or to one side. Our particular design of translating means is equally accurate in all positions and all conditions of speed and vibration.

As we have previously pointed out, the slider 116 and resistance 78 of the translating means control the magnetic coils 84 and 86 of the speed indicating means, and the cam 126 and switch contacts 112 and 114 of this same translating means control the mileage indicating means. The speed indicating means, which we shall first describe, is shown most clearly in Figures 12 through 18, inclusive.

The speed indicating means includes a frame 212 which has a cup-shaped member 214 secured to its forward end by bolts 216. In this cup-shaped member is located a dial plate 218 carrying suitable indicia marked thereon. The pointer 100 cooperates with this indicia and is supported on and rotated by the pointer shaft 220. This shaft is journalled in a strip 222 and in bearing block 225, both suitably secured to the frame 212.

The pointer shaft 220 is provided with an enlargement 224 having spaced flanges 226 and 228, between which is located the hub of an inertia wheel 230. The hub of this inertia wheel frictionally engages the enlargement 224 and rotates therewith during the normal operation of the instrument. When the shaft 220 is subjected to sudden shocks or vibration which tend to oscillate the shaft, the hub of the inertia wheel 230 slips relative to the enlargement 224, thereby absorbing the energy of such shocks and vibrations and minimizing their influence on the shaft 220 and pointer 100. This form of damping device has the great advantage that the force of the shocks and vibrations is spent in friction and is not stored up and then later returned to the pointer shaft.

Figure 16:
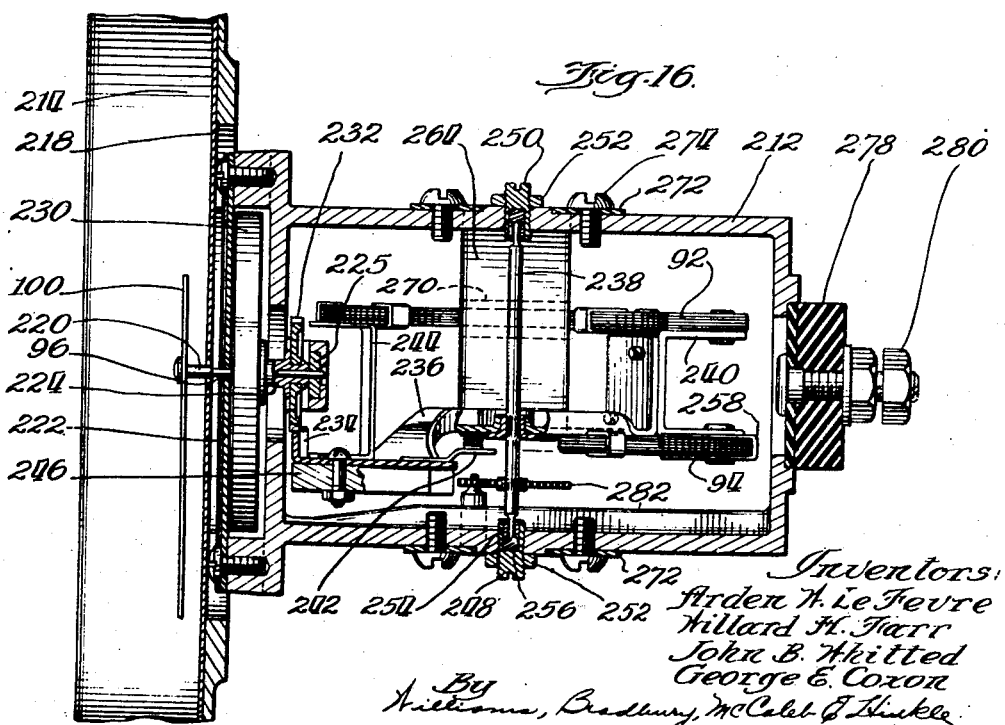
Figure 16 is an enlarged section taken on the line 16—16 of Figure 15.

The pointer shaft 220 is rotated by a gear 232 which engages the segmental rack 234 formed on one end of an armature support 236. As best shown in Figure 16, this armature support is formed of sheet metal and is mounted on the vertical armature shaft 238. One end of the support 236 is offset and turned upwardly at its edge to form the rack 234, whereas the other end in the support 236 is bent parallel to the shaft 238 and has secured thereto a U-shaped armature support 240. The large ends of the armatures 92 and 94 are attached to the respective arms of the U-shaped support 240. The small end of armature 94 is supported by a metal strip 242 attached to the offset end of the support 236. The small end of the armature 92 is supported by a second U-shaped member 244. A balance weight 246 is bolted to the end of the support 236 which is adjacent the small ends of the armatures.

The armature shaft 238 is supported in adjustable bearing members 248 and 250 which are held firmly in adjusted position by suitable locknuts 252. Each of the bearing members 248 and 250 carries a guide sleeve 254 and a jewel 256 which takes the axial thrust of the shaft 238.

The vertical arrangement of this armature shaft 238 is important from several standpoints. In the first place, it makes possible a bearing structure in which the weight of the shaft and part supported thereby can be carried on an inexpensive jewel 256 which provides a practically frictionless bearing. The vertical arrangement of this shaft makes this shaft and its supporting parts less subject to the effect of roll, sway, vibration and other movements of the automobile body. The vertical positioning of this shaft 238 also makes it unnecessary to balance the several parts carried thereby with any great degree of accuracy, and this materially reduces the cost of manufacture. Furthermore, the vertical arrangement of the shaft 238, in combination with the horizontal arrangement of the pointer shaft 220, produces a structure wherein vibration and sway of the automobile body tends to produce opposing movements in the shafts 220 and 238, with the result that the particular arrangement of these two shafts, of itself, tends to cancel the effects of vibration and sway or roll of the automobile body.

The vertical arrangement of the shaft 238, in combination with the horizontal arrangement of the shaft 220, produces other desirable characteristics. It produces an extremely compact structure and one in which the pointer shaft is most desirably positioned for the convenience of the automobile operator, while at the same time giving the most efficient location for the armature shaft 238. As will be more fully pointed out later, the maximum possible movement for the shaft 238 is one hundred and eighty degrees, whereas it is desirable that the indicia on the dial 218 cover an angle far greater than one hundred and eightly degrees. Because of the right-angle relationship of the shafts 220 and 238, a geared relationship is possible which gives the pointer shaft 220 a much greater angular movement than that of the armature shaft 238.

This geared relationship of the pointer shaft 220 with the armature shaft 238 makes it necessary that the coils 84 and 86 and armatures 92 and 94 produce greater turning effort on the shaft 238 than would be necessary if the pointer 100 were mounted directly on this shaft. One of the important features of our invention lies in the provision of an armature and coil assembly of utmost efficiency and which is capable of producing this additional torque with the small electrical current permissible.

Figure 15:
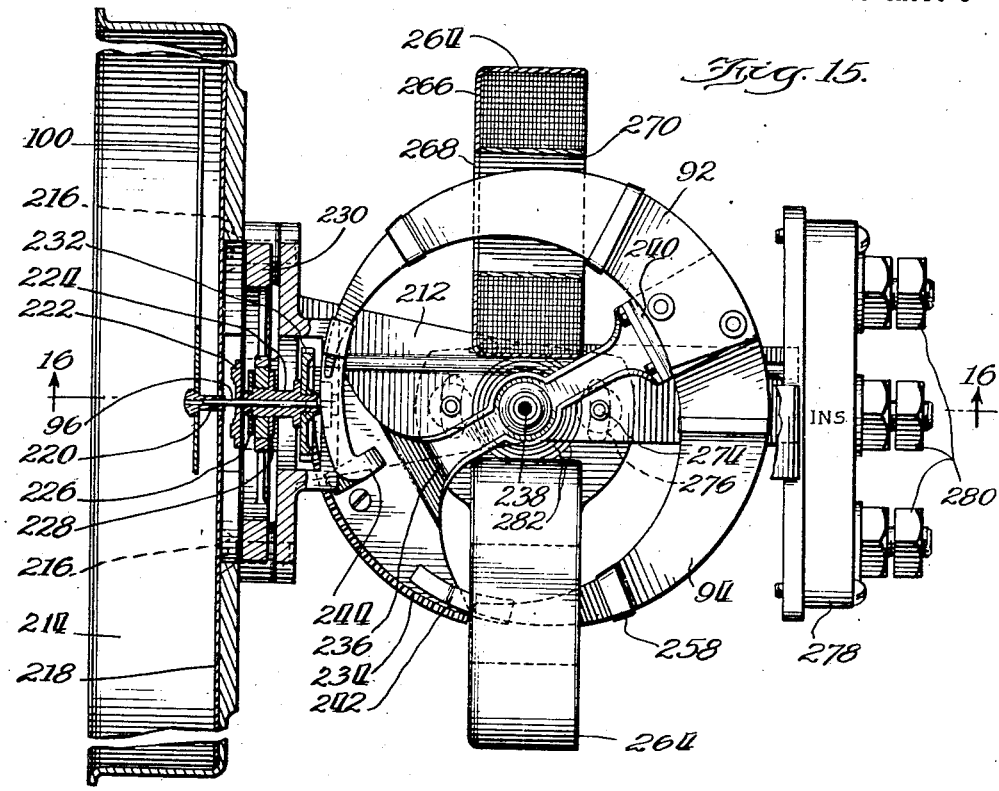
Figure 15 is an enlarged horizontal section taken on the line 15—15 of Figure 14.

In order to reduce eddy currents and hysteresis loss to a minimum, the armatures 92 and 94 are composed of a plurality of thin sheets of carefully selected soft iron. These sheets are held together by clips 258. The armatures, as best shown in Figure 15, are given an arcuate shape and each armature tapers from one end to the other. In Figure 23 we have shown a developed view of one of the armatures for the purpose of more clearly showing the exact nature of its taper. Both armatures are alike and each has a progressively steeper taper from its large end 260 to its small end 262.

We have found it desirable to make the cross-sections of the armatures sufficiently large so that the magnetic saturation of the iron never rises above the rectilinear portion of the B—H curve. With armatures of such large cross-sections, lag is eliminated and more accurate reading of the instrument is obtained.

The armatures 92 and 94 are spaced from each other in the direction of the axis of the shaft 238. This offset relationship reduces the magnetic inter-reaction between the two sets of armatures and coils and has the further advantage of providing greater space for the parts and thus facilitates assembly, repair and calibration.

For convenience of manufacture and assembly, each coil set, consisting of a magnetic coil and its associated heating coil, for example, the magnetic coil 86 and heating coil 90, is wound as a unit with the turns of the heating coil outside of the turns of the magnetic coil. The loops of this unitary coil assembly need be bound together only to the extent necessary to permit handling of this assembly as a unit. Each of these coil assemblies is then placed in a sheet-metal container, such as that indicated at 264 in Figure 15. Each container consists of a sheet-metal cup 266 having a bottom opening 268 surrounded by a rectangular member 270 which provides the rectangular opening through which the associated armature passes, as best shown in Figures 20 and 21.

After the coil assembly has been placed in its container 264, it is dipped in impregnating material which has the three-fold function of forming a protective coating and insulation for the coil turns, and of holding them in the container 264. Each coil container 264 is mounted on a support 272 which is adjustably attached to the top or bottom of the frame 212, for example, as by means of bolts 274 and slot 276, best shown in Figure 13. The rear of the frame 212 carries an insulating bar 278 which carries the three terminals 280 for connecting the coils with the wire 84 from the automobile battery, the wire 80 leading to the ground, and the circuit including the slider 116.

When the ignition switch 72 is open, no current passes through the magnetic coils 84 and 86. During such times it is desirable that the armature and pointer shafts be maintained in a definite position with the pointer opposite the zero mark on the dial 218. We therefore provide an extremely light spiral spring 282 having one end attached to the armature shaft 238 and its opposite end attached to a stud carried by the frame 212. This spring has no function during operation of the speed indicating means, and this indicating means is so calibrated that the spring 282 produces no effect on the reading of the pointer 100.

From the preceding description of the indicating means, it will be seen that we have provided a mechanism which is compact and desirably locates the pointer shaft opposite the center of the armature shaft. The effect of road shocks and body roll and sway has been eliminated by the vertical positioning of the armature shaft, the opposing inertia forces of the armature and pointer shafts, and the inertia wheel 230. The geared relationship between the armature shaft and the pointer shaft permits the pointer to travel over a wide scale while the armature shaft moves through a much narrower angle, thereby permitting the use of short armatures with steep tapers, which is the most efficient design.

Heating coils have been provided to maintain the two magnetic coils at the same temperature, thereby eliminating distortion due to uneqeual heating of these coils. The armatures are made of material selected to reduce hysteresis loss to a minimum and are laminated because we have found that better torque and quicker response result therefrom.

The magnetic permeability of the iron of the armatures varies inversely with the temperature of the armatures so that even where both armatures always have equal temperatures it is desirable to provide means for compensating for the changes in the permeability of the iron of the armatures as a result of the atmospheric temperature variations and temperature increases in the armatures resulting from the operation of the instrument.

In Figures 19 and 20 we have compensated for this variation in permeability by attaching the armatures to the armature shaft through the medium of temperature responsive bimetallic strips 284 and 286.

As the temperature of the armature 288 rises and its magnetic permeability thereby decreases, the bimetallic strip 286 deflects to move the armature 288 in the direction of the arrow and thus reduces the cross-section of that part of the armature which is located within the coil 290. This withdrawal of the armature 288 from the coil 290 is so designed that it is proportional to the decrease in magnetic permeability of the armature 288, with the result that the torque produced by armature 288 and coil 290 remains constant for any given current passing through the coil 290. Each bimetallic strip 284 and 286 has one end wrapped around the armature shaft 292 and clamped thereto by a bolt 294. By loosening a bolt 294, the associated bimetallic strip and armature may be shifted relative to the armature shaft for purposes of calibration.

In Figures 21 and 22 we have shown a structure for compensating for the increase in electrical resistance of the magnetic coils as the temperature of these coils rises. In these figures the coil 296 is shown as being attached to one end of a bimetallic strip 298 which has its other end attached to a part 300 which is rigid with the frame 212. The coil container 302 is carried by a pair of aluminum strips 304 and 306 which have offset ends 308 and 310, respectively, which lie parallel to and slightly spaced from the bimetallic strips 298. The purpose of these aluminum strips 304 and 306 is to convey the heat from the coil to the bimetallic strip 298 which is so arranged that as the coil heats up it is moved toward the small end of its associated armature.

The correlated mileage part of the indicating means is best shown in Figures 24 through 33, and comprises a frame indicated generally by reference numeral 312. This frame is of metal and is designed for suitable attachment to the rear of the instrument board in such manner that the indicia may be readily seen by the driver of the vehicle.

The coil 106, which we have previously described in connection with its cooperating relationship in the entire mechanism, is supported by the frame 312 and has a suitable iron core 314 secured at one end to the frame 312 by bolt 316. Opposite the other end of the core 314 is an armature 318 pivoted on pins 320 carried by the frame 312. The armature 318 pivots freely on the pins 320 and is normally held in the position shown in Figure 27 by the combined action of springs 322 and 324. Spring 322 is the stronger of the two. The armature 318 is not held against any stop when shown in the position of Figure 27, its rest position being determined solely by an equalization of the forces created by the weight of the armature and the relative strengths of the two springs. The armature is held securely in this position even when the vehicle is traveling over the roughest road.

When the ignition switch 72 is closed and the cam 126 establishes a circuit through the contacts 112 and 114, the coil 106 is energized and that end of the armature 318 which is adjacent the core 314 is moved downwardly until the center line of the armature 326 is in the horizontal plane passing through the center line of the core 314. When the armature swings to this latter position, its downward movement ceases, and as soon as contacts 112 and 114 separate and coil 106 is deenergized, the armature 318 returns to the position shown in Figure 27. No stops are provided for limiting movement of the armature 318 in either direction, and in this manner the operation of the armature and the entire mechanism has been rendered substantially noiseless.

A bracket 328 is attached to the upper side of armature 318 and has pivoted thereon a pawl 330 for engaging the teeth of a ratchet-wheel 332. On each downward oscillation of the armature 318, the ratchet wheel 332 is advanced one tooth so that, by providing the proper relationship between the number of teeth on the ratchet-wheel 332 and the number of rotations of the driving wheels 54 for each rotation of the cam 126, each advancement of the ratchet-wheel 332 will conform to a definite distance traveled by the automobile. Retrograde movement of the ratchet-wheel 332 is prevented by dog 334, the dog 334 and pawl 330 being held against the ratchet-wheel by a common spring 336.

The ratchet-wheel 332 is mounted on a shaft 338, the hub of the ratchet-wheel being provided with a slot 340 for receiving the ends of a pin 342 extending through the shaft 338. As shown in Figure 33, the hub of the ratchet-wheel 332 has pressed thereon a collar 344 provided with a single pair of teeth 346 which, during each complete rotation of the ratchet-wheel, engage and rotate through a predetermined distance a pinion 348 mounted in a support 350 rigidly attached to the sleeve 352 non-rotatably held in the frame 312. Pinion 348 engages the gear 354 formed on one lateral extension of the hub of an indicia-carrying drum 356. The opposite extension of the hub of drum 356 carries a pair of teeth 358 which are similar to the teeth 346 and which engage a second pinion 360 mounted on a support 362 attached to sleeve 352 between drums 356 and 364. The adjacent end of the hub of drum 364 is provided with a gear similar to the gear 354. In this same manner all of the drums of group A are driven successively, one from the other.

The trip mileage is indicated by the drums of group B. This trip mileage indicating means must be capable of being reset to read "zero" at any time. Such resetting must be accomplished without interfering with the electrical circuits or in any manner disturbing the electrical relationships existing therein. The resetting means which we shall now describe complies with all of these requisites.

One end of the shaft 338 carries a gear 366 which is press-fitted to the shaft 338 and rotates therewith. Gear 366 is provided with openings for slidably receiving the tongue-like ends 368 formed on the hub of drum 370. That part of the hub of drum 370 which extends in the opposite direction is provided with a pair of teeth similar to the teeth 358 previously described in connection with drum group A, this pair of teeth on the hub of drum 370 functioning to engage a pinion 372 (Figure 31) and rotate the same through a predetermined distance once during each complete rotation of the drum 370.

The pinion 372 is carried by a spacing member 374 located between drum 370 and drum 376. A detent 378 is provided to prevent accidental rotation of the pinion 372. The pinion 372 engages a gear 380 on the adjacent end of the hub of drum 376. Similar spacing members 382 and 384 are provided between the other pairs of indicia-carrying drums in the trip register B, and similar driving means are provided to drive each drum from the preceding drum. A spring disk 386, shown most clearly in Figures 26 and 32, presses the drums of the trip register against a stop 388.

The hub of drum 370 is non-rotatably attached to a sleeve 390 in which shaft 338 can slide axially. Coil spring 392, interposed between this sleeve 390 and gear 366, normally holds shaft 338 at one limit of its movement. As best shown in Figure 31, sleeve 390 carries a spring finger 394, one of these spring fingers being provided for each of the drums of the trip register except drum 370. The spring fingers 394 bear against the inner periphery of their respective drums and permit these drums to be rotated in one direction relative to sleeve 390, but when a force is exerted which tends to produce relative movement in the opposite direction between these drums and the sleeve 390, the spring fingers 394 engage in notches 396 in their respective drums and cause said drums to rotate with the sleeve 390.

Each of the spacing members 374, 382 and 384 is provided with a pair of notched ears 398 and 400. The three notched ears 398 are tied together by a rod 402, and the three ears 400 are tied together by a second rod 404. The rods 402 and 404 serve the dual purpose of preventing relative rotation between the members 374, 382 and 384 and also keep these members properly spaced. The three ears 400 and their associated rod 404 received in a slot 406 provided in the frame 312, and in this manner the spacing members 374, 382 and 384 are held against rotation.

A shaft 408 which forms a resetting handle is shown as rotatably mounted in an extension of the frame 312. In both Figures 24 and 26 this shaft is shown in idle position. One end of the shaft is knurled as indicated at 410, and the other end is tapered as indicated at 412, and engages the rounded end of shaft 338.

When the shaft 408 is moved toward the left, as shown in Figure 26, the tapered end 412 pushes shaft 338 upwardly against the tension of spring 392 and moves the cross-pin 342 beyond the slot 340 of ratchet-wheel 332. This same movement of shafts 338 and 408 brings the gear 414 into engagement with gear 366 and thereupon the trip indicating means may be quickly reset by rotating shaft 408 in the proper direction. After the trip indicating means have been reset, the shaft 408 is returned to the position shown in Figure 26, whereupon spring 392 returns shaft 338 to the position shown in this figure.

Because the mileage indicating means may be connected to the speed indicating means only through the medium of electrical conductors, it is entirely feasible to mount the speed indicating means and the mileage indicating means at different places on the instrument board of the vehicle. This provides much greater latitude in the mounting of the several instruments which are ordinarily associated with the instrument board, and for this reason, is a decided advantage. Where desired, the indicating means for both speed and mileage may be mounted in the same casing, as shown in Figures 34, 35 and 36.

In these figures we have shown a single casing 416 having a face including a dial plate 418 provided with suitable speed indicating indicia and further provided with openings for the season and trip mileage indicating means. The pointer which cooperates with the speed indicating indicia is mounted on a horizontal shaft driven by mechanism located in the upper part of the casing 416, said mechanism being the same as that previously described in connection with Figures 4 to 18, inclusive.

The mechanism of the mileage indicating means is located in the lower part of the casing 416 and is essentially the same as that described in detail in connection with Figures 24 to 33, inclusive, the principal differences lying in the angular arrangement of the resetting handle 420 with respect to the coil 106, and the spring for holding the pawl in engagement with the ratchet-wheel. In this embodiment we have shown the pawl 422 as being held in engagement with its ratchet-wheel by a leaf spring 424 carried by the same bracket 426 on which the pawl 422 is pivoted.

Where the coil 106 is mounted in the same casing with the armatures 92, 94 and coils 84 and 86, means must be provided to prevent the magnetic effect of the coil 106 from influencing the reading of the speed indicating means. We have therefore provided a special shielding which takes the form of a plate 428 located between the coil 106 and the coils and armatures for actuating the pointer. This plate 428 is attached to and constitutes in effect a part of the casing 416 and, together therewith, provides magnetic separation between the coil 106 and the coils and armatures for operating the speed pointer. The entire face of the casing is shown as protected by a glass plate 430, and it is to be understood that the casing is suitably mounted in the instrument board in a position to be easily seen by the driver.

In Figure 37 we have shown a circuit arrangement in which there is provided a delayed ballast resistance 74' which is not affected by the normal currents passing through coils 84, 86 and 106. However, if the automobile is stopped in such position that the contact controlling the current to the coil 106 remains closed and the ignition switch is in the "on" position, then resistance 74' heats up, thereby increasing its resistance and preventing damage to the coil 106.

In this circuit the heating coils 432 and 434 are formed of a very few turns of ballast wire instead of a large number of turns of copper wire as in the case of the circuit shown in Figure 2. This reduces the total bulk of the combined heating and magnetic coils and permits the heating coils to be wound inductively since the very few turns of ballast wire necessary to create the proper heating effect produce a negligible magnetic effect.

In Figure 38 we have shown a partial circuit diagram indicating a different arrangement of the heating coils 436 and 438. In this circuit arrangement these heating coils are non-inductively wound and are arranged in parallel with the magnetic coils 84 and 86 instead of being in series therewith, as shown in the circuits illustrated in Figures 2 and 37.

In the partial circuit arrangement shown in Figure 39 the magnetic coils 84 and 86 are in parallel with the non-inductively wound heating coils 440 and 442 and also with the resistance 78. In this type of circuit the lead from the battery is connected to one end of each of the magnetic coils 84 and 86, and the slider 444 is grounded to the automobile frame.

In Figure 40 the magnetic coils 84 and 86 are in series with the non-inductively wound heating coils 446 and 448 and all four of these coils are in parallel with the resistance 78. In this circuit, as in the preceding circuit, the slider 444 is grounded to the automobile frame.

Figure 41 illustrates a preferred form of ballast resistance and mounting therefor. The ballast resistance wire is wound into a close coil 450 connected to long leads 452 and 454 attached to the upright ends of strips 456 and 458 mounted on a block of insulation 460. The close coils concentrate the heat generated in the ballast resistance into a small space, thus reducing the effective radiating surface and raising the operating temperature of the wire. The long leads reduce the loss of heat due to conduction to the strips 456 and 458.

From the foregoing description, it will be appreciated that we have invented a novel speedometer which is particularly adapted for rear-engined automobiles. This speedometer contains in and of itself all compensating means necessary to render it accurate at all times and under all of the strenuous conditions to which such a speedometer is exposed. It is to be understood that our invention is not limited to the exact details of construction illustrated herein, and that the scope of our invention is limited solely by the following claims.

We claim:

1. In an automobile having a rear mounted engine, rear wheels driven therefrom through power transmission mechanism, an instrument board remote from said engine wheels and power transmission mechanism, said engine having an ignition system, the combination of electrically-operated speed and mileage indicating means mounted on said instrument board, a battery for operating said means, said battery being connected to said ignition system and being of variable voltage, translating means driven from said power transmission means and located at a point remote from said instrument board, electrical connections between said translating means and said indicating means, said translating means controlling said indicating means, means connecting said indicating means and translating means with said battery and including a variable resistance automatically compensating for variations in battery voltage, and a single switch in said last-named means for simultaneously controlling electrical communication between said battery and said indicating means and between said battery and said ignition system.

2. In an automotive vehicle having an electrically-controlled source of power and driving means driven therefrom, the combination of electrically-driven means for indicating speed and mileage, a battery for supplying current to said means and to said source of power, said battery having a variable voltage, translating means varying the current supplied to said indicating means in conformity with speed and distance, means connected to said indicating means for compensating for changes in battery voltage, and a single switch through which said battery is connected to said indicating means and said source of power.

3. In indicating mechanism of the class described, the combination of electrically-operated means for indicating speed and mileage, a common source of variable electrical energy therefor, translating means connected to said indicating means and controlling electrical current therethrough, variable pursuant to the speed and mileage of a part to be measured, and means effective automatically for preventing variations in battery voltage from distorting said speed and mileage indicating means.

4. In indicating means of the class described, the combination of a shaft, a pair of armatures connected therewith, a magnetic coil for each of said armatures, means for supplying current to said coils, the magnetic effect of each coil tending to rotate said shaft in a different direction, means for varying the relative strengths of the currents in said coils, and means for maintaining the temperatures of said coils equal at all times.

5. In indicating means of the class described, the combination of a shaft, a pair of armatures attached thereto, a coil for each armature, a source of electrical energy for said coils, each of said coils tending to rotate said shaft in a different direction, means for varying the relative strengths of the currents passing through said coils pursuant to variations in a characteristic of a part being measured, and heating coils associated with said first-mentioned coils for maintaining the same at equal temperatures, irrespective of the relative values of the currents passing through said first-mentioned coils.

6. In mechanism of the class described, a rotatable shaft, indicating means operated thereby, an armature attached to said shaft, a coil associated with said armature, a source of electrical energy for said coil, means for varying the current through said coil pursuant to variations in a characteristic of a part being measured, said coil and armature tending to rotate said shaft in one direction, means for compensating for the effect of heat produced by the current through said coil, said means changing the space relationship between said coil and armature, and means for rotating said shaft in the opposite direction.

7. In mechanism of the class described, the combination of indicating means, an oscillable shaft for operating said means, a pair of armatures attached to said shaft, an electromagnetic coil for each armature, each coil tending to oscillate said shaft in a different direction, a source of electrical energy connected to said coils, calibrating means for changing the relative space relationships between said armatures and coils, and means for varying the relative values of the currents supplied to said coils pursuant to variations in a characteristic of a part being measured.

8. In a speedometer of the class described, the combination of indicating means including an oscillable shaft, a coil and armature for oscillating said shaft, said armature being tapered, said taper being steeper at the smaller end of said armature, a source of electric energy for said coil, and speed-responsive means for varying the current supplied to said coil from said source, said speed-responsive means including centrifugal weights having one lever arm corresponding to one part of said armature and a second lever arm corresponding to a different part of said armature.

9. In a speedometer of the class described, the combination of indicating means including a pointer mounted on an oscillable shaft, means for oscillating said shaft including a coil and its associated armature, said armature being progressively tapered from one end to the other, the steeper part of said taper corresponding to the low speed position of said indicating means, a battery for supplying current to said coil, and means for varying said current in accordance with the speed of an automotive vehicle, said last-named means including a centrifugally-responsive weight controlling a current bearing element through a long lever arm at low speed and through a shorter lever arm at high speed.

10. In mechanism of the class described, the combination of indicating means including an oscillable shaft, a coil and armature for oscillating said shaft, a source of electrical energy for said coil, means for varying the current passing through said coil pursuant to variations in a characteristic being measured, said armature being tapered and including a small end having a steeper degree of taper than the rest of said armature, and a switch for disconnecting said coil from said source.

11. In mechanism of the class described, the combination of indicating means, a shaft for operating said means, a pair of separate armatures connected to said shaft, a coil associated with each armature, calibrating means whereby relative displacement may be effected between each coil and its associated armature, a source of electrical energy for said coils, and translating means for varying the currents flowing through said coils.

12. In an automobile speedometer of the class described, the combination of a shaft positioned vertically to the road bed over which the automobile travels, an armature carried by said shaft, a coil associated with said armature, indicating means driven by said shaft, and speed-responsive means for supplying a variable current to said coil.

13. In an automobile speedometer of the class described, the combination of a shaft positioned perpendicular to the road bed over which the automobile travels, an armature eccentrically mounted on said shaft, a coil associated with said armature, a counterbalance for said armature, said position of said shaft making it less affected by sway and roll of the automobile body, and speed-responsive means for supplying a variable current to said coil.

14. In an automobile speedometer of the class described, the combination of an armature, a coil cooperating therewith, a shaft carrying said armature and arranged with its axis perpendicular to the roadway over which the automobile travels, a jeweled bearing carrying the weight of said shaft and receiving the shocks resulting from vertical vibrations of the automobile body, and speed-responsive means for supplying a variable current to said coil.

15. In an automobile speedometer of the class described, the combination of a pair of connected shafts creating counteracting inertia forces in response to vibrations of the automobile body, indicator means operated by said shafts, and speed-responsive means for oscillating said shafts.

16. In an automobile speedometer of the class described, the combination of indicating means, an oscillable shaft for operating said means, an inertia fly-wheel carried by said shaft, and speed-responsive means for oscillating said shaft.

17. In an automobile speedometer of the class described, the combination of indicating means, a rotatable shaft for operating said means, an inertia fly-wheel frictionally engaging said shaft for movement relative thereto under the influence of forces resulting from vibration of an automobile body, and speed-responsive means for rotating said shaft.

18. In an automobile speedometer of the class described, the combination of indicating means, a shaft for operating said means over a wide scale, an armature shaft, movement multiplying means connecting said shafts whereby a small rotation of said armature shaft produces a greater rotation of said first-mentioned shaft, a short steeply-tapered armature mounted on said armature shaft, a coil associated with said armature, and speed-responsive means for supplying a variable current to said coil.

19. In an automobile speedometer of the class described, the combination of indicating means, an armature shaft for operating said means, an armature carried by said shaft, an electric coil associated with said armature, said armature being laminated to limit the values of currents induced therein during sudden acceleration and deceleration of an automobile vehicle, and speed-responsive means for supplying a variable current to said coil.

20. In an electric indicator of the class described, the combination of indicating means, an oscillable shaft for operating said means, a pair of magnetic coils for oscillating said shaft in opposite directions, a heating coil wound on the outside of each magnetic coil to prevent temperature differences between said magnetic coils, and means for supplying variable currents to said coils.

21. In a speedometer of the class described, the combination of indicating means, armatures and magnetic coils for operating said means, a variable resistance for controlling the current supplied to said coils, centrifugally-operated weights controlling said resistance, a pair of springs of different but overlapping strengths resisting movement of said weights under the influence of centrifugal force, and means for rotating said weights.

22. In an electric speedometer of the class described the combination of indicating means, armatures and coils for operating said means, a variable resistance for controlling the current supplied to said coils, centrifugally-operated weights controlling said resistance, a leaf spring and a coil spring mounted on a common adjustable support and resisting movement of said weights under the influence of centrifugal force, and means for rotating said weights.

23. In an automobile speedometer of the class described, the combination of indicating means, electromotive means for operating said indicating means, a variable resistance for controlling said electromotive means, a movable bar controlling said resistance, a pair of weights for moving said bar under the influence of centrifugal force acting on said weights, said weights being connected to said bar by links, a leaf spring resisting movement of said bar under the influence of said weights, said spring having slotted ends engaging said links to prevent rotation between said spring and said bar, and means for rotating said spring, bar and weights.

24. In a speedometer of the class described, the combination of indicating means, motor means therefor, and speed-responsive means for controlling said motor means, said speed-responsive means including a pair of pivoted links, means for rotating said links, a weight carried by the pivotal connection between said links and influenced by centrifugal force to create relative movement between said links, means for rotating said links and weight at different speeds, said weight at low speed having its center of mass above and radially outward from the pivotal connection between said links, said weight at high speed having its center of mass in a plane which is perpendicular to the axis of rotation and which passes through the pivotal connection between said links, and a control element operated by said links.

25. In an automobile speedometer of the class described, the combination of indicating means, electromotive means for operating said indicating means, and speed-responsive means for controlling said electromotive means, said speed-responsive means including a pair of weights, each weight comprising an arc-shaped segment of an irregular curve, said arc-shaped segment having one radial edge of greater length than the other, a pivotal mounting for each weight adjacent the point of intersection between said radial edges, means for rotating said weights, and a control element movable in response to the action of centrifugal force upon said weights.

26. In a speedometer of the class described, the combination of indicating means, motor means therefor, and speed-responsive means for controlling said motor means, said speed-responsive means including a centrifugal weight, a pivotal mounting for said weight spaced from the center of mass thereof, means for rotating said weight throughout a wide range of speeds, and stop means for preventing movement of said weight about its pivot during a portion only of said speed range.

27. In a speedometer of the class described, the combination of indicating means, electromotive means for operating said indicating means, speed-responsive means for supplying variable electromotive forces to said electromotive means, said speed-responsive means including a pair of pivotally-connected links, means for holding and rotating one end of said links, a movable control member attached to the other end of said links, a centrifugal weight pivotally mounted on the pivotal connection between said links, said pivotal mounting for said weight being spaced from the center of mass of said weight, and stop means carried by said weight and engaging one of said links to prevent relative pivotal movement between said weight and said link.

28. In a speedometer of the class described, the combination of indicating means, electromotive means for operating said indicating means, and speed-responsive means for controlling the current supplied to said electromotive means, said speed-responsive means including a variable resistance having a slider, centrifugally-actuated weights rotatable about a predetermined axis, a member movable lengthwise of said axis under the influence of said weights, and a double jeweled bearing between said slider and said member, said bearing located on said axis.

29. In a speedometer of the class described, the combination of indicating means, electromotive means for operating said indicating means, speed-responsive means for controlling said electromotive means, said speed-responsive means including a variable resistance having a slider, a parallelogram mounting for said slider, a movable member engaging one link of said parallelogram, and means for moving said member in direct relationship to vehicle speed.

30. In a speedometer of the class described, the combination of indicating means, electromotive means for operating said indicating means, and speed-responsive means for controlling said electromotive means, said speed-responsive means including centrifugal weights rotated about a predetermined axis, a member movable lengthwise of said axis under the influence of said weights, a variable resistance having a slider pivoted to a support at one side of said axis, a pair of links pivotally connected to each other and to said slider and said support, thereby providing a parallelogram mounting for said slider, one of said links engaging said member and slidable relative thereto in a series of planes, each plane being perpendicular to said axis.

31. In an automobile speedometer of the class described, the combination of indicating means, electromotive means for operating said indicating means, a source of electrical energy, and speed-responsive means mounted on a part of said automobile which is subjected to shock and vibration, said speed-responsive means having an axis of rotation for parts thereof, said speed-responsive means being equally accurate for all positions of said axis with respect to the horizontal and also with respect to the direction of movement of said vehicle, speed-responsive means including a variable resistance having a slider adapted to move in a short arc symmetrical with respect to said axis, said slider having a U-shaped pivoted end mounted in a bracket at one side of said axis, a link pivoted to said slider and adapted to lie along said axis at both extreme positions of said slider, a second link pivotally connecting said first-named link to said bracket, centrifugal weights rotatable about said axis, means for rotating said weights, a member movable lengthwise of said axis under the influence of said weights, adjustable resilient means for resisting the movement of said member, contacting jewels forming a bearing between said member and said first-mentioned link, one of said jewels being mounted in said member and the other being mounted in said link, the jewel in said link being movable in a series of planes, all of which are perpendicular to said axis.

32. In an electric indicator of the class described, the combination of indicating means, a shaft for operating said means, an armature associated with said shaft, a coil cooperating with said armature, a container for said coil having an open side, an impregnated coating for said coil constituting both a protection against injury to said coil and a means for holding said coil in said container, a source of electrical energy, and speed-responsive means for controlling the current passing from said source to said coil.

33. In an electric indicator of the class described, the combination of indicating means, a movable member for operating said means, electromotive means for moving said member in each of two directions, a source of electromotive force, speed-responsive means for varying the current supplied to said electromotive means by said source, a switch for disconnecting said source from said electromotive means, and means for moving said member in one direction when said switch is open.

34. In an electric indicator of the class described, the combination of indicating means, a shaft for operating said means, a pair of electromotive elements for moving said shaft, one of said elements comprising an armature and the other comprising an electromagnetic coil, means for supplying an electric current to said coil, means for varying the value of said current, and a heat-responsive mounting for one of said elements, said heat-responsive mounting changing the space relationship between said armature and said coil pursuant to temperature variations created by said current.

35. In an electric indicator of the class described, the combination of indicating means, a movable member for operating said means, an armature attached to said member, an electromagnetic coil associated with said armature, a source of current for said coil, means for varying the value of said current, a bimetallic mounting for said coil, and aluminum plates for conducting heat created in said coil by said current to said bimetallic mounting whereby the position of said coil is shifted pursuant to temperature variations created therein by said current.

36. In an indicator of the class described, the combination of indicating means, an oscillable shaft for operating said means, an armature, a bimetallic support for said armature adjustably attached to said shaft, said bimetallic support shifting the relative positions of said armature and said shaft pursuant to heat variations created in said support, an electromagetic coil associated with said armature, a source of current for said coil, and means for varying the value of the current passing through said coil.

37. In an indicator of the class described, indicating means, a pivoted armature for operating said means, a pair of oppositely acting springs attached to said armature and constituting the sole means for determining one position thereof, an electromagnetic means for moving said armature to a second position, a source of electrical energy connected to said electromagnetic means, and control means for said electromagnetic means operated in response to a characteristic being measured.

38. In an electric indicator of the class described, the combination of indicating means, noiseless electromotive means for operating said means, a source of current for said electromotive means, and control means for said current, said electromotive means including an electromagnetic coil, a pivoted armature movable between two positions, one of said positions being determined solely by said magnetic coil, and balancing resilient means determining the other position of said armature.

39. In an electric speedometer of the class described, the combination of speed and mileage indicating means, electromotive means for operating said indicating means, a source of variable electromotive force for said last-named means, a circuit including said source and said electromotive means, voltage balancing means for said circuit, and means for returning said speed and mileage indicators to zero without disturbing said circuit.

40. In a speedometer of the class described, the combination of speed and mileage indicating means, electromagnetic means for actuating said indicating means, a common casing for said speed and mileage indicating means, means associated with said casing for preventing magnetic inter-reaction between said speed and mileage indicating means, a common source of electromotive force for said speed and mileage indicating means, and a common control for said speed and mileage indicating means.

41. In a speedometer of the class described, the combination of indicating means, a shaft for operating said means, electromagnetic means for rotating said shaft, means for moving said shaft in an axial direction to disconnect said last-named means from said first-named means, a source of electrical energy, and means interposed between said source and said electromagnetic means for controlling the latter.

42. In an indicator of the class described, the combination of a pair of indicating means, electromagnetic means for operating both indicating means, a source of energy for said electromagnetic means, means for controlling the flow of current from said source to said electromagnetic means, means for disconnecting one of said indicating means from said electromagnetic means to permit resetting of said indicating means, said disconnecting means including a shaft carrying a clutch member, means for moving said shaft in an axial direction to disconnect said clutch member from a complementary member connected to said electromagnetic means, means for thereafter resetting said disconnected indicating means, and resilient means for reengaging said clutch members.

43. In an indicator of the class described, the combination of indicating means, electromotive means for operating said indicating means, said electromotive means including opposed magnetic coils, a source of electromotive energy for said coils, a resistance in parallel with said coils, a slider in electrical engagement with said resistance and movable throughout the length thereof, means connecting said slider intermediate said coils, and means for shifting the position of said slider.

44. An indicator of the class described, comprising indicating means, a pair of opposed electromagnetic coils for actuating said means, a source of electrical energy for said coils, a pair of heating coils, each heating coil being in series with one of said magnetic coils and in heat transmitting relationship with the other of said magnetic coils, and means for varying the currents through said heating coils and magnetic coils.

45. In an electric indicator of the class described, the combination of indicating means, a pair of opposed magnetic coils for operating said means, a source of electrical energy for said magnetic coils, means for varying the currents flowing through said coils, and heating coils in parallel with said magnetic coils and in heat transmitting relationship thereto.

46. In an indicator of the class described, the combination of indicating means, a pair of opposed magnetic coils for operating said means, a source of electromotive energy for said coils, non-inductively wound heating coils associated with said magnetic coils for preventing the creation of a temperature differential therebetween, and means for varying the currents supplied to said coils.

47. In an electrical indicator of the class described, the combination of indicating means, a pair of opposed magnetic coils for operating said means, a source of electric current for said coils, means for varying the currents passing through said coils, and a magnetically-wound heating coil associated with each magnetic coil for preventing the creation of a temperature differential between said magnetic coils.

48. In an electric speedometer of the class described, the combination of speed and mileage indicating means, electromotive means for actuating each of said indicating means, said electromotive means forming part of a circuit having the same battery, switch and ballast resistance, and a common rotating element for controlling both indicating means.

49. In an indicator of the class described, the combination of indicating means, electromagnetic means for operating said indicating means, a battery having a variable voltage for supplying current to said last-named means, means for compensating for variations in battery voltage, said means comprising a wire having a high heating coefficient of resistance, said wire being wound into a close coil exposed to atmosphere and supported by long leads, and speed-responsive means for varying the current supplied by said battery to said electromagnetic means.

50. In an indicator of the class described, indicating means, a pivoted armature for operating said means, spring means for moving said armature in one direction and for determining one position thereof, electromagnetic means for moving said armature to a second position, said armature and said magnetic means being conformed to provide a magnetic stop constituting the sole means for limiting movement of said armature away from said first position, a source of electrical energy connected to said electromagnetic means, and control means for said electromagnetic means operated in response to a characteristic being measured.

51. In an indicator of the class described, indicating means, a pivoted armature operable from one limiting position to another for operating said means, an electromagnet adapted when energized to actuate said armature in a predetermined direction, a resilient stop for determining one of said limiting positions of said armature, a magnetic stop for determining the other of said limiting positions of said armature, a source of electrical energy connected to said electromagnetic means, and control means operated in response to a characteristic being measured for intermittently energizing said electromagnet.

52. In indicating means of the class described, the combination of a shaft, a pair of armatures connected therewith, a magnetic coil for each of said armatures, means for supplying current to said coils, the magnetic effect of each coil tending to rotate said shaft in a different direction, means for varying the relative strengths of the currents in said coils, and means including a heating coil in series with each magnetic coil for heating the other magnetic coil for maintaining the temperatures of said magnetic coils equal at all times.

53. In indicating means of the class described, the combination of a shaft, a pair of armatures connected therewith, a magnetic coil for each of said armatures, means for supplying current to said coils, the magnetic effect of each coil tending to rotate said shaft in a different direction, means for varying the relative strengths of the currents in said coils, and means including a heating coil in parallel with each magnetic coil for heating the other magnetic coil for maintaining the temperatures of said magnetic coils equal at all times.

ARDEN W. LEFEVRE.
JOHN B. WHITTED.
GEO. E. COXON.
WILLARD H. FARR.